United States Patent
Sasaki (10) Patent No.: US 11,245,857 B2
(45) Date of Patent: Feb. 8, 2022

(54) APPARATUS FOR GENERATING HIGH-DYNAMIC-RANGE IMAGE, METHOD, AND STORAGE MEDIUM

(71) Applicant: CANON KABUSHIKI KAISHA, Tokyo (JP)

(72) Inventor: Yoshitaka Sasaki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/105,154

(22) Filed: Aug. 20, 2018

(65) Prior Publication Data

US 2019/0068866 A1 Feb. 28, 2019

(30) Foreign Application Priority Data

Aug. 29, 2017 (JP) .............................. JP2017-164824

(51) Int. Cl.
*H04N 5/235* (2006.01)
*H04N 5/232* (2006.01)
*H04N 9/69* (2006.01)
*H04N 9/73* (2006.01)
*H04N 9/04* (2006.01)

(52) U.S. Cl.
CPC ......... *H04N 5/2355* (2013.01); *H04N 5/2352* (2013.01); *H04N 5/2353* (2013.01); *H04N 5/23245* (2013.01); *H04N 9/04515* (2018.08); *H04N 9/69* (2013.01); *H04N 9/73* (2013.01)

(58) Field of Classification Search
CPC ............. H04N 5/2355; H04N 5/23245; H04N 5/2352; H04N 5/2353; H04N 9/04515; H04N 9/69; H04N 9/73
See application file for complete search history.

(56) References Cited

U.S. PATENT DOCUMENTS

| 9,325,919 B2* | 4/2016 | Uchida | H04N 5/378 |
| 2008/0187235 A1* | 8/2008 | Wakazono | H04N 5/243 382/255 |
| 2012/0257077 A1* | 10/2012 | Suzuki | H04N 5/2355 348/222.1 |
| 2015/0271382 A1* | 9/2015 | Sekine | H04N 5/2353 348/229.1 |
| 2015/0348242 A1* | 12/2015 | Molgaard | G06T 5/002 348/241 |

FOREIGN PATENT DOCUMENTS

JP 2011004088 A 1/2011

* cited by examiner

*Primary Examiner* — Twyler L Haskins
*Assistant Examiner* — Fayez A Bhuiyan
(74) *Attorney, Agent, or Firm* — Rossi, Kimms & McDowell LLP (57) ABSTRACT

An object of the present invention is to generate a high-dynamic-range image with fewer pseudo-contours. An apparatus of the present invention generates a high-dynamic-range image and includes a setting unit for setting an imaging condition for each region that constitutes an image. The apparatus includes a setting unit configured to set an exposure condition for the region and a correcting unit configured to correct the set exposure condition so that a difference between a maximum value and a minimum value out of the set exposure condition is small.

21 Claims, 8 Drawing Sheets

| EXPOSURE CONDITION | ISO SENSITIVITY | SHUTTER SPEED (SEC) |
|---|---|---|
| 0 | 200 | 1/100 |
| -1 | 100 | 1/100 |
| -1 | 200 | 1/200 |
| -1 | 400 | 1/25 |

FIG.8

APPARATUS FOR GENERATING HIGH-DYNAMIC-RANGE IMAGE, METHOD, AND STORAGE MEDIUM

BACKGROUND OF THE INVENTION

Field of the Invention

The present invention relates to a technique for generating a high-dynamic-range image.

Description of the Related Art

In general, a dynamic range offered by an imaging element such as a CCD and a CMOS used in digital cameras and digital video cameras is narrower than a dynamic range in nature. Accordingly, in a case of photographing a scene of a broad dynamic range (which is called a high-dynamic range; hereinafter abbreviated as an HDR) using a normal method, shadow-detail loss and highlight-detail loss may possibly occur. Various methods are studied for acquiring such an image of a high-dynamic range (which is called an HDR image; in contrast, an image of a normal dynamic range is called an LDR image).

As a typical method of acquiring an HDR image, the technique of HDR composition is known. In the HDR composition, first of all, an exposure period is varied and an object is image-captured repeatedly in plural times to acquire a plurality of images. Next, with respect to each of the plurality of images, gain adjustment is made based on the exposure period at the time of capturing each image. Lastly, for each pixel position, an optimum pixel is extracted among the plurality of gain-adjusted images or weighted average of a plurality of pixel values for gain-adjusted images is obtained so as to acquire a composite image having a broad dynamic range. However, in a method of combining a plurality of images such as the HDR composition, there is a problem that the handling of a moving object is difficult due to different exposure periods for respective images.

On the other hand, as a method of not requiring the plurality of images, there is proposed a method of using an HDR sensor which can set different exposure periods in pixels (Japanese Patent Laid-Open No. 2011-004088). In this method, an HDR image can be acquired in one image, but in a case where a difference in exposure periods between adjacent pixels is large, a difference in image quality occurs at their boundary. Thus, smoothing processing on the exposure periods for pixels at the boundary is applied so as to reduce the difference in exposure periods at the boundary, thereby alleviating the difference in image quality.

SUMMARY OF THE INVENTION

However, in the method of smoothing only the exposure periods for pixels at the boundary, shadow-detail loss or highlight-detail loss may possibly occur only on the portion of the boundary. As a result, a pseudo-contour is likely to occur at the boundary between a smoothed pixel and a non-smoothed pixel. Thus, in consideration of the above problem, an object of the present invention is directed to generating a high-dynamic-range image having fewer pseudo-contours.

An apparatus of the present invention generates a high-dynamic-range image and includes a setting unit for setting an imaging condition for each region that constitutes an image. The apparatus includes a setting unit configured to set an exposure condition for the region and a correcting unit configured to correct the set exposure condition so that a difference between a maximum value and a minimum value out of the set exposure condition is small.

Further features of the present invention will become apparent from the following description of exemplary embodiments with reference to the attached drawings.

DESCRIPTION OF THE EMBODIMENTS

First Embodiment (Configuration of Image Processing Apparatus)

Figure 1A:
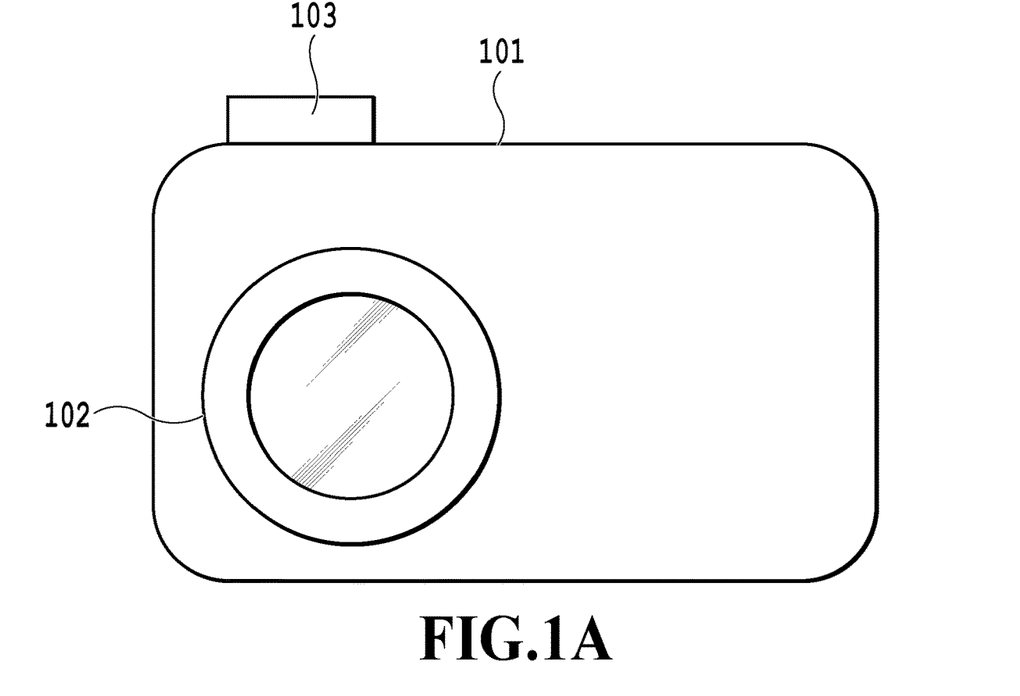
FIGS. 1A and 1B are schematic views showing appearances of an image processing apparatus (image capturing apparatus)
Figure 1B:
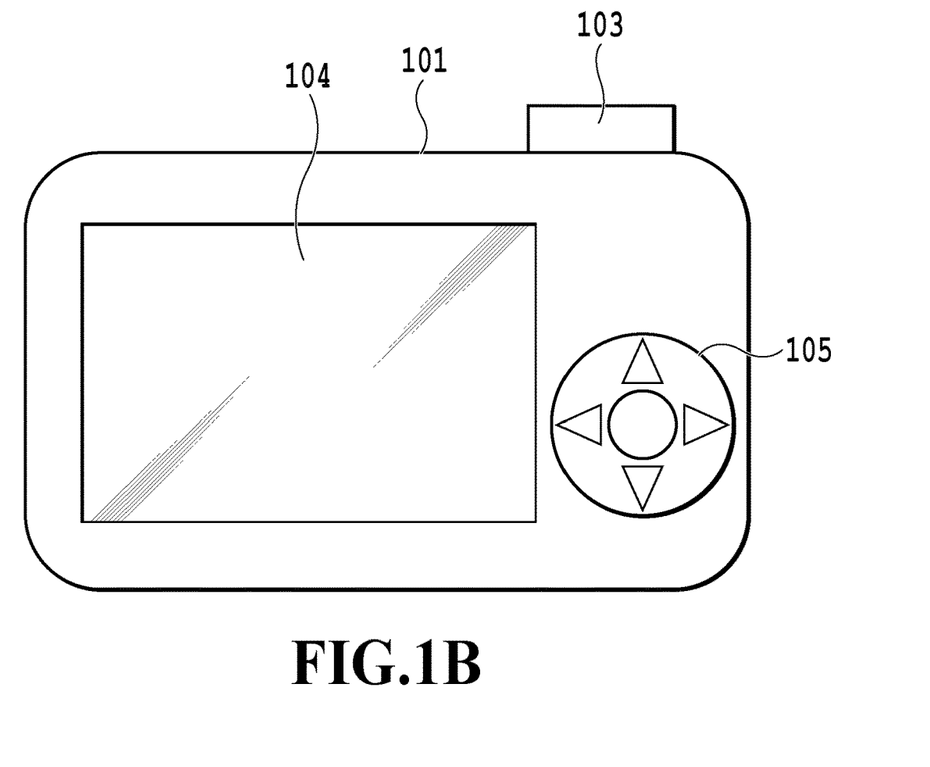

A configuration of the image processing apparatus according to the present embodiment will be described below by taking an image capturing apparatus as an example. FIGS. 1A and 1B are views showing a configuration of the image capturing apparatus according to the present embodiment. More specifically, FIG. 1A is a front view of an image capturing apparatus 101 and FIG. 1B is a back view of the image capturing apparatus 101. The image capturing apparatus 101 includes an optical unit 102, a photographing button 103, a display unit 104, and an operation button 105. The optical unit 102 is composed of a zooming lens, focusing lens, blur correcting lens, aperture, shutter, and the like, and acquires optical information on an object by collecting light. The photographing button 103 is a button to be used by a user to instruct the image capturing apparatus 101 to start photographing. In the display unit 104, various kinds of data such as image data processed by the image capturing apparatus 101 are displayed. As the display unit 104, an LCD display, for example, is used. The operation button 105 is a button to be used by a user to input items such as specifying parameters of imaging conditions.

Figure 2:
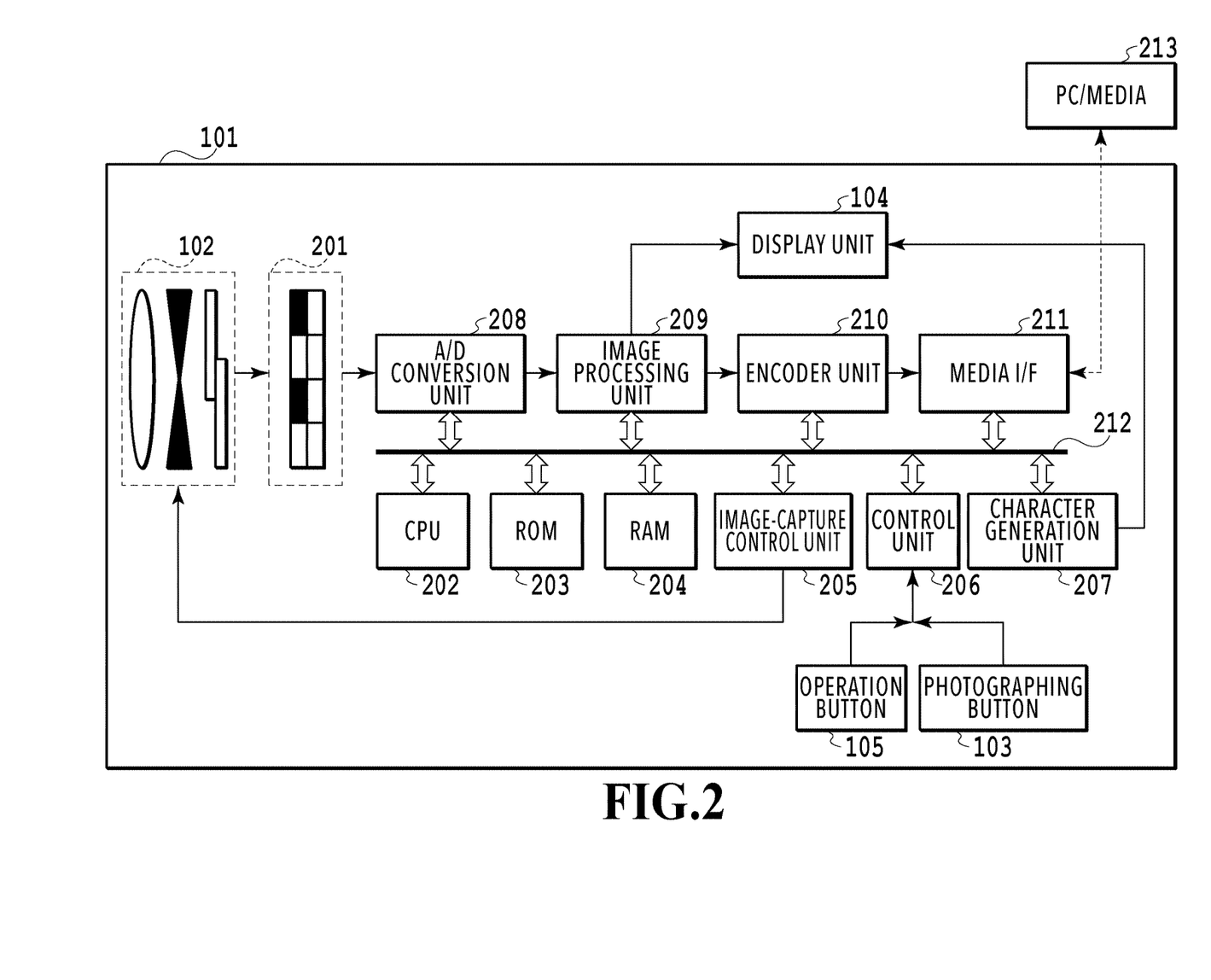
FIG. 2 is a block diagram showing an internal configuration of the image processing apparatus (image capturing apparatus)

FIG. 2 is a block diagram showing an internal configuration of the image capturing apparatus 101 according to the present embodiment. An imaging element 201 converts optical information acquired by the optical unit 102 into a current value. By using the imaging element 201 together with a color filter, color information is acquired. It should be noted that, according to the present embodiment, an HDR sensor which can set an exposure condition for each pixel or each region is used as the imaging element 201. The exposure condition refers to a condition for controlling the exposure, and more specifically, includes any one or more of an aperture, a shutter speed, and sensitivity. A value for the exposure condition is determined in accordance with at least one of the respective values for the aperture, the shutter speed, and the sensitivity. The HDR sensor adaptively controls exposure for each pixel or each region, and more specifically, adjusts at least one of an exposure period and an analog gain for each pixel or each region to acquire a high-dynamic-range image (HDR image). It should be noted that, in the case of controlling exposure for each region, the exposure period and the analog gain can be adjusted for each rectangular region such as a four-pixel region by 2×2 and a six-pixel region by 3×2. However, the unit of regions for controlling the exposure are not limited to those, and any unit of a region may be set. A CPU 202 is associated with all processing performed in the components, and sequentially reads and interprets instructions stored in a ROM (read only memory) 203 and a RAM (random access memory) 204 to execute processing in accordance with those results. Such processing includes processing according to the present embodiment as will be described below.

An image-capture control unit 205 follows an instruction from the CPU 202 and controls the optical unit 102, that is, to be more specific, makes control such as focusing, opening the shutter, and adjusting the aperture. A control unit 206 controls the start, end, and the like of imaging operation in response to user instructions, that is, the user's pressing of the photographing button 103 and the operation button 105. A character generation unit 207 generates data such as characters and graphics for displaying them on the display unit 104.

An A/D conversion unit 208 converts the light amount of an object detected by the imaging element 201 into a digital signal value. The image processing unit 209 performs image processing on image data in which each pixel has a digital signal value obtained as a result of conversion by the A/D conversion unit 208. An encoder unit 210 performs conversion processing to convert image data processed by the image processing unit 209 into a file format such as Jpeg. A media I/F 211 is an interface for transmitting/receiving image data to/from a PC/media 213, that is, a PC and/or media. It should be noted that the media described herein includes a hard disc, a memory card, a CF card, an SD card, and the like. A system bus 212 is a bus for transmitting/receiving data.

(Imaging Processing)

Figure 4:
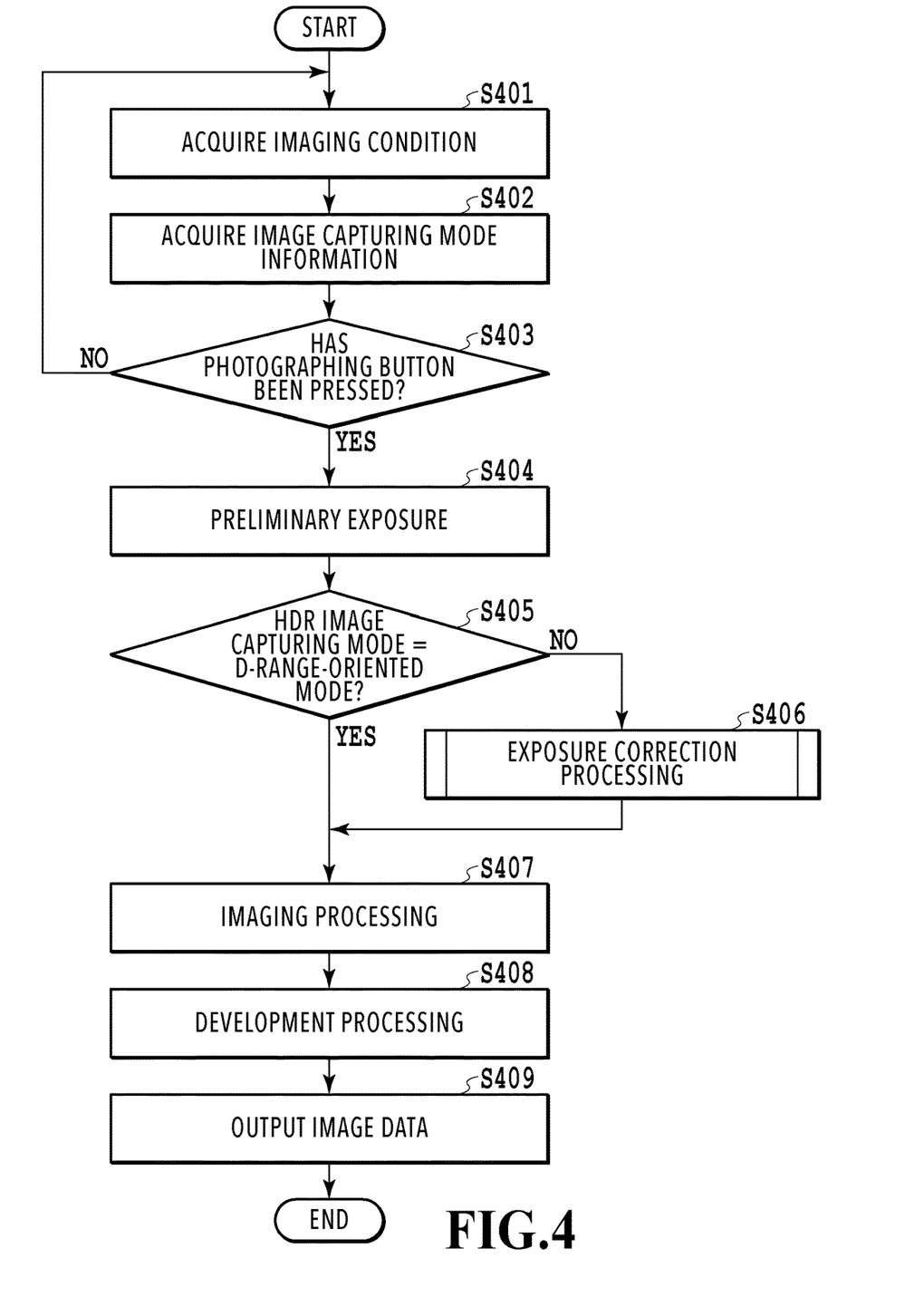
FIG. 4 is a flowchart of imaging processing performed by the image processing apparatus (image capturing apparatus)

With reference to FIG. 4, imaging processing performed by the image capturing apparatus 101 according to the present embodiment will be described below.

In Step S401, the CPU 202 acquires an imaging condition that has been inputted through a user's operation of the operation button 105. This imaging condition includes at least one of a lens aperture value, a shutter speed, and ISO sensitivity.

Figure 3:
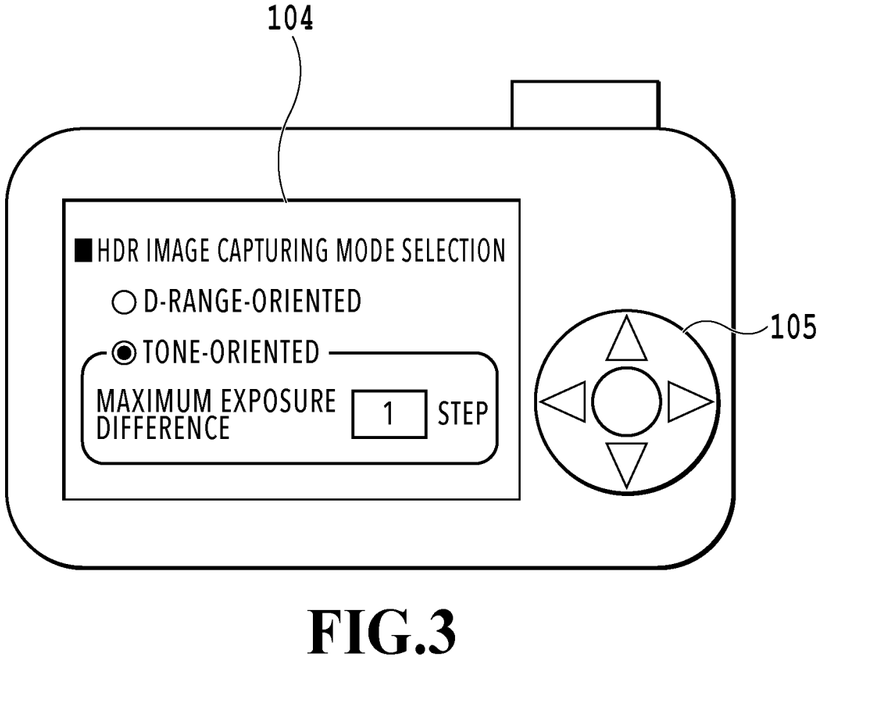
FIG. 3 is a schematic view illustrating a UI in which an image capturing mode is selected.

In Step S402, the CPU 202 acquires information (referred to as image capturing mode information) indicating an image capturing mode set by the user. FIG. 3 is an example of a user interface (UI) for setting an image capturing mode to be displayed on the display unit 104. The user selects a desired image capturing mode by operating the operation button 105. A case where the user can select either a dynamic range oriented mode (hereinafter referred to as a D-range-oriented mode) which represents a broad dynamic range or a tone-oriented mode which places a priority on tone representation as the image capturing mode for acquiring an HDR image (hereinafter referred to as an HDR image capturing mode) will be described below. In the case where the user selects the tone-oriented mode, an allowable maximum exposure difference (denoted as Eth) must be specified. Further, an explanation will be given below in a case where a maximum exposure difference, Eth, is equal to 1 [step] as shown in FIG. 3. However, as a matter of course, a maximum exposure difference, Eth, allowable for the specifying is not limited to 1, but any one value larger than 0 can be specified. However, in a case where a maximum exposure difference is set to be too large, a difference between the image quality of the tone-oriented mode and the image quality of the D-range-oriented mode becomes small. Accordingly, it is preferable that Eth be within the range between ⅓ and 1. It should be noted that the image capturing mode set by the user is not limited to the above. An image capturing mode other than the HDR image capturing mode, that is, an image capturing mode adapted to an object such as a person or a landscape or an image capturing mode adapted to weather such as a sunny or cloudy scene may be set. Alternatively, an image capturing mode combining those image capturing modes may be set as well.

In Step S403, the CPU 202 determines whether the photographing button 103 is pressed by the user. In the case where the determination result in Step S403 is true, the process advances to Step S404. Meanwhile, in the case where the determination result in Step S403 is false, the process returns to Step S401.

Figure 5A:
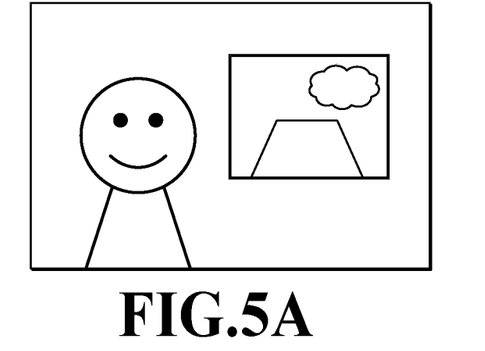
FIGS. 5A to 5C are schematic views illustrating an exposure condition for each region determined by preliminary exposure.
Figure 5B:
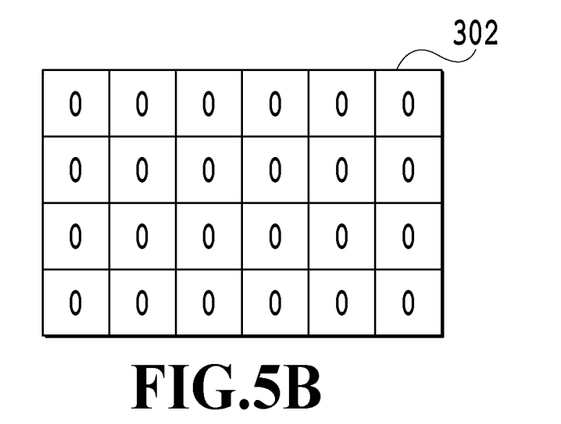
Figure 5C:
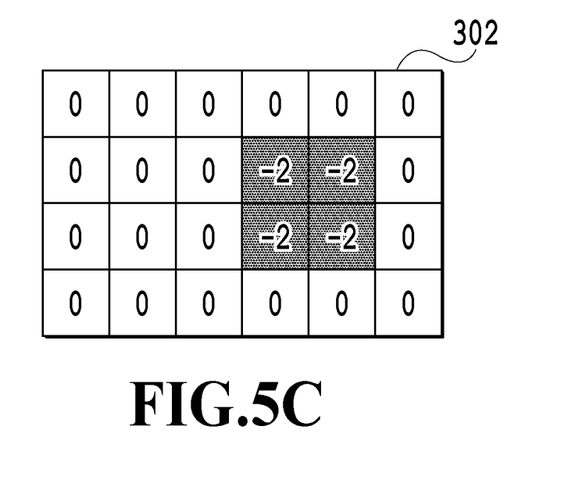

In Step S404, the CPU 202 causes the image-capture control unit 205 to drive the optical unit 102 to perform preliminary exposure, thereby determining the exposure condition for each region of the imaging element 201. FIG. 5A to FIG. 5C are schematic views illustrating an example of the exposure condition for each region. FIG. 5A is a schematic view of an image capturing scene at the time of photographing a person indoors. There is a window at the back of the person, and light enters inside from the outside. In this step, with respect to such an image capturing scene, an exposure condition is set for each region in a processor element array layer 302 as shown in FIG. 5B and FIG. 5C.

FIG. 5B shows an exposure condition for each region to be set in the case where the scene shown in FIG. 5A is to be shot in the image capturing mode for acquiring the LDR image so as to appropriately expose the person. As shown in the figure, as a result of setting values (i.e., 0) of the entirely uniform exposure condition, highlight-detail loss may occur in a window region which is brighter than the inside where the person is present.

FIG. 5C shows an exposure condition for each region to be set in the case where the scene shown in FIG. 5A is to be shot in the HDR image capturing mode. As shown in the figure, values (i.e., 0) of an exposure condition similar to FIG. 5B are set for the exposure of the indoor region including the person, thereby resulting in appropriate exposure. Meanwhile, smaller values (i.e., −2) of an exposure condition are set for the window region. By setting such smaller values of exposure condition for the window region, the occurrence of highlight-detail loss can be suppressed. An explanation will be given below regarding the case of FIG. 5C, that is, the case where an exposure condition of the indoor region is set to 0 and an exposure condition of the window region is set to −2 as a result of performing the preliminary exposure.

In Step S405, the CPU 202 determines whether the HDR image capturing mode that has been specified through image capturing mode information acquired in Step S402 is the D-range-oriented mode. In the case where the determination result in Step S405 is true, the process advances to Step S407. Meanwhile, in the case where the determination result in Step S405 is false, the process advances to Step S406.

In Step S406, the CPU 202 executes exposure correction processing to correct an exposure condition for each region that has been set in Step S404. Incidentally, the details of the exposure correction processing will be described later with reference to FIG. 7.

In Step S407, the image-capture control unit 205 in which an instruction has been received from the CPU 202 drives the optical unit 102 in accordance with the imaging condition that has been acquired in Step S401 and the exposure condition that has been set at least in either one of Step S404 and Step S406 so as to shoot the object. As a result, the light amount of the object is obtained and is detected by the imaging element 201, that is, the HDR sensor. Further, image data in which each pixel has light amount expressed in a pixel value is converted into RAW image data in the A/D conversion unit 208. Incidentally, the RAW image data described herein is image data that has only one color out of R, G, and B for each pixel.

In Step S408, the image processing unit 209 applies development processing on the RAW image data and generates RGB image (image data of a bitmap type in which each pixel has three channels, that is, pixel values of R, G, and B). In general, development processing which generates RGB image from RAW image data includes white balance processing, demosaic processing, and gamma processing.

In Step S409, the CPU 202 outputs image data to which the development processing has been applied in Step S408. For instance, the CPU 202 causes the display unit 104 to display image data, or causes the encoder unit 210 to convert such image data into a file format such as Jpeg so as to output the resultant to the PC/media 213, that is, an external PC and/or media, via the media I/F 211.

As such, according to the present embodiment, processing is switched in accordance with the HDR image capturing mode. In the case where the HDR image capturing mode is the tone-oriented mode, exposure correction processing is performed. Meanwhile, in the case where the HDR image capturing mode is the D-range-oriented mode, the imaging processing is performed without performing the exposure correction processing. Accordingly, in the case where the user takes a photograph in the tone-oriented mode, it is possible to suppress the occurrence of pseudo-contours such as tone inversion which is likely to occur in the case where the dynamic range of an object is broad. The above is the content of imaging processing in the present embodiment.

(Exposure Correction Processing)

Figure 7:
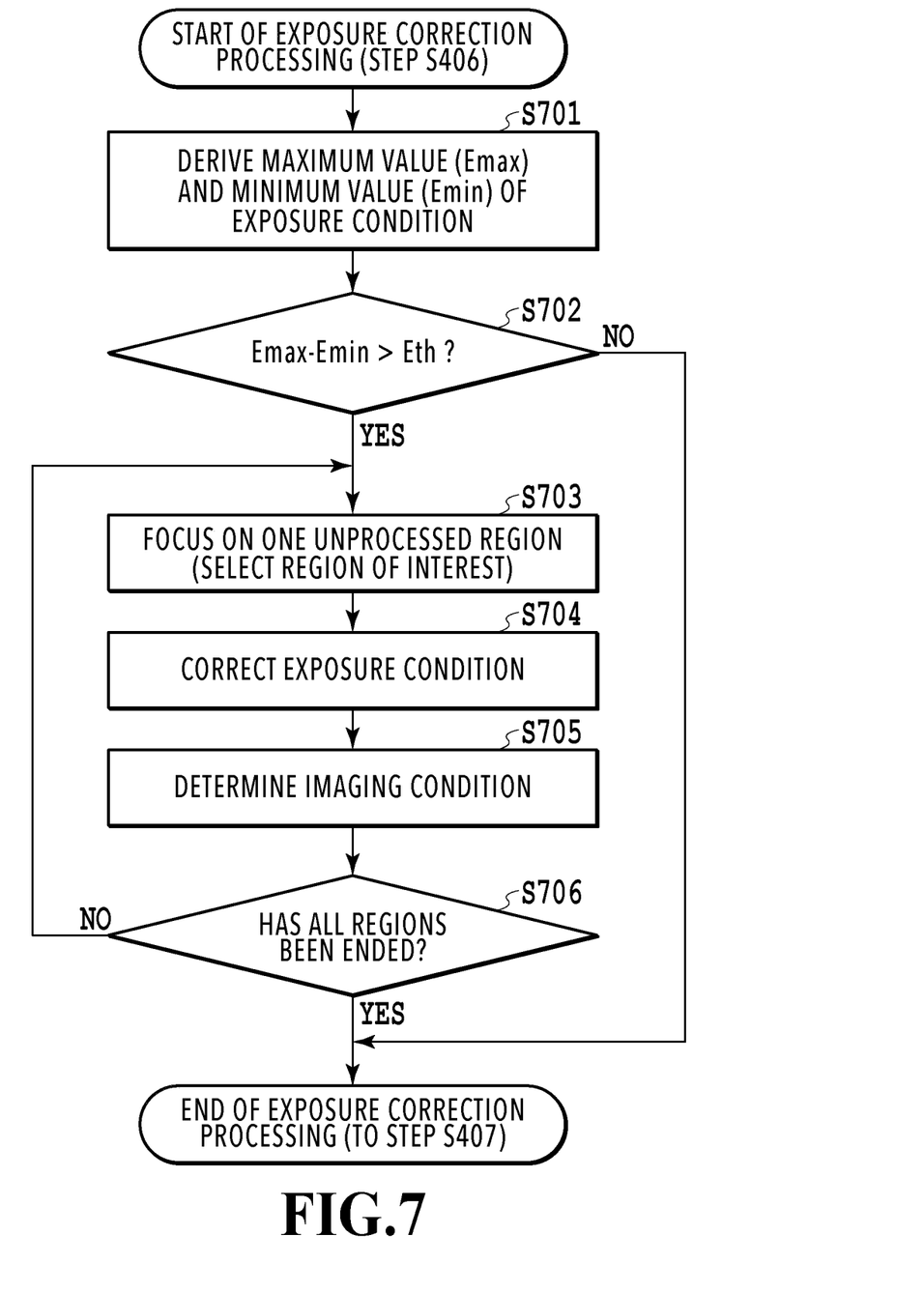
FIG. 7 is a flowchart of the exposure correction processing.

With reference to FIG. 7, exposure correction processing performed in Step S406 in FIG. 4 will be described below.

In Step S701, the CPU 202 scans each region in the processor element array layer 302 to derive a maximum value (denoted as Emax) and a minimum value (denoted as Emin) among the exposure conditions of the regions. In the case of FIG. 5C, for example, Emax=0 and Emin=−2.

In Step S702, the CPU 202 determines whether a difference between Emax and Emin is larger than Eth obtained in Step S402 based on Emax and Emin that have been derived from Step S701. In the case where the determination result in Step S702 is true, the process advances to Step S703. Meanwhile, in the case where the determination result in Step S702 is false, the exposure correction processing ends.

In Step S703, the CPU 202 focuses on one unprocessed region in the processor element array layer 302. In this step, one region to be focused on is described as a region of interest.

In Step S704, the CPU 202 corrects an exposure condition of a region of interest so that the difference between a maximum value and a minimum value among exposure conditions within an image becomes equal to or lower than a maximum exposure difference (equal to or lower than Eth). A correction of the exposure condition in this step is made, for example, by following Equation (1) below.

$$E' = \frac{E_{th}}{E_{max} - E_{min}} E \qquad \text{Equation (1)}$$

Figure 6A:
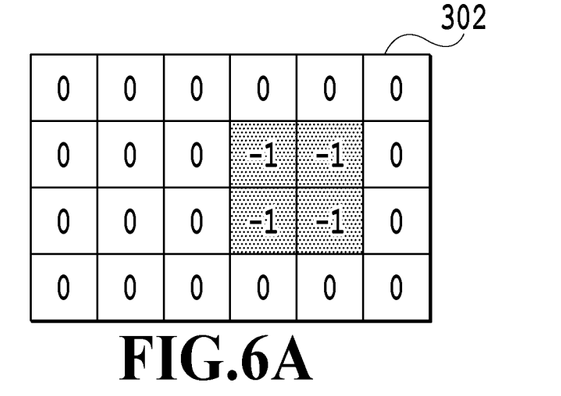
FIGS. 6A and 6B are schematic views illustrating an exposure condition for each region after exposure correction processing.

In Equation (1), E represents an exposure condition after correction, and E represents an exposure condition before correction. FIG. 6A is a diagram showing a result of correcting each of the exposure conditions for each region shown in FIG. 5C by following Equation (1). It should be noted that an expression to be used for correction of exposure conditions is not limited to the above Equation (1), and other expressions may also be used as long as the difference between a maximum value and a minimum value is equal to or less than Eth. Alternatively, a conversion table including the preset relation between maximum values, minimum values, Eth values, exposure conditions before correction, and exposure conditions after correction being stored in the image capturing apparatus 101 may be used, in place of the expressions, to correct exposure conditions. Correction of exposure conditions in this step allows reducing an exposure difference between adjacent regions and thus suppressing the occurrence of pseudo-contours.

Figure 6B:
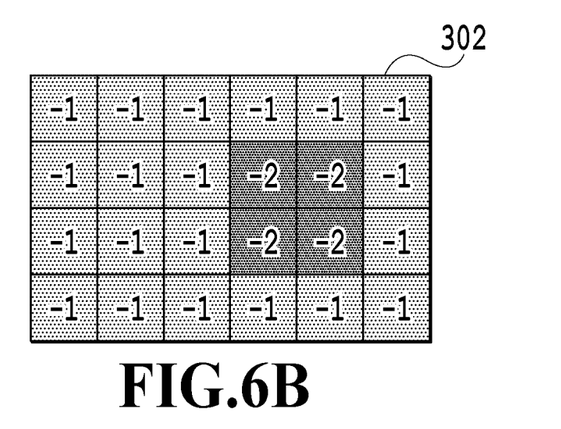

Further, in a case of fixing an exposure of a region where exposure condition is other than 0, the exposure may be fixed such that a region that retains an exposure condition (referred to as a reference region) is set, and based on a corrected value obtained by calculation using Equation (1) and an exposure condition of the reference region, an exposure condition of a region where an exposure is unfixed may be shifted. In FIG. 6B, the result of exposure correction processing in the case where the window region is set as a reference region is shown. It should be noted that the reference region may be arbitrarily set by the user, or may be automatically set by the image capturing apparatus 101 by placing a central region or the like of an image capturing scene as a reference region.

Figure 8:
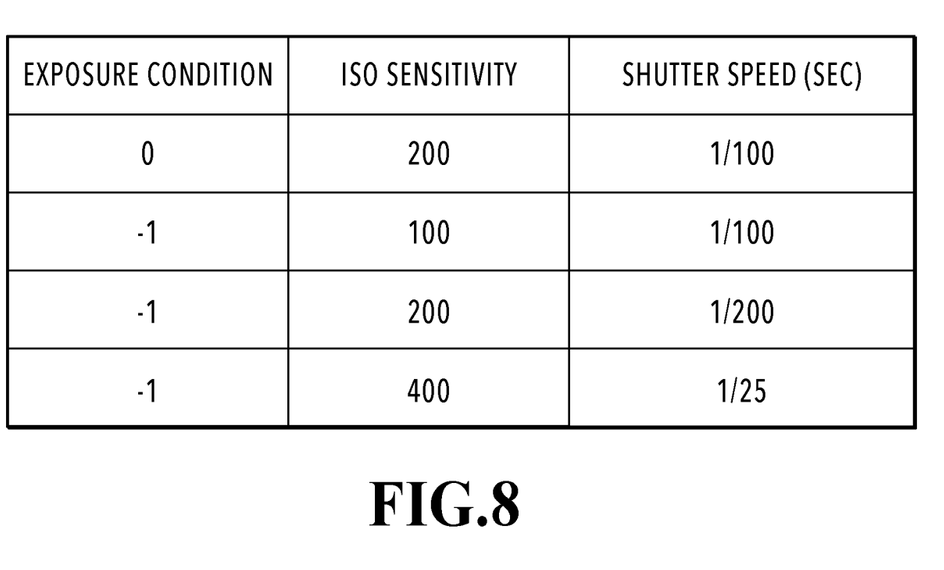
FIG. 8 is a table illustrating the relation between exposure conditions and imaging conditions.

In Step S705, the CPU 202 determines an imaging condition for a region of interest in accordance with the exposure condition that has been corrected in the previous Step S704. An exposure is typically controlled by adjusting an aperture, a shutter speed, and an analog gain. However, in the present embodiment, the exposure is controlled by fixing an aperture and by adjusting at least either one of a shutter speed and an analog gain which are locally adjustable. It should be noted that the degree of an analog gain for the HDR sensor is in proportion to that of ISO sensitivity, and accordingly, the case of controlling ISO sensitivity will be described below. FIG. 8 is a table showing an example of imaging conditions corresponding to exposure conditions. As shown in the figure, in the case where an exposure condition is 0, ISO sensitivity is assumed to be 200 and a shutter speed is assumed to be 1/100 sec. An explanation will be given below, as one example, on how imaging conditions vary in a case where the exposure condition is changed from 0 to −1. In order to lower the exposure condition by one step, the ISO sensitivity may be reduced by half while keeping the shutter speed or the shutter speed may be reduced by half while keeping the ISO sensitivity. Alternatively, as shown in the last line of the table in FIG. 8, it is possible to change both the ISO sensitivity and the shutter speed for lowering the exposure condition by one step. It should be noted that the method of determining the imaging condition based on the exposure condition is not limited to the above, and a method may be appropriately determined in conformance with the image capturing mode by, for example, placing a priority on a shutter speed or fixing ISO sensitivity.

In Step S706, the CPU 202 determines whether series of processing of Step S703 through Step S705 are performed for all the regions. In the case where the determination result in this step is true, the series of processing end. Meanwhile, in the case where the determination result in this step is false, the process returns to Step S703. The above is the content of the exposure correction processing in the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to generate a high-dynamic-range image having fewer pseudo-contours.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-164824 filed Aug. 29, 2017, which is hereby incorporated by reference wherein in its entirety.

What is claimed is:

1. An apparatus that generates a high-dynamic-range image by setting an imaging condition for each region of a plurality of regions of an image, the apparatus comprising:
one or more processors; and
one or more memories storing instructions that, when executed by the one or more processors, cause the apparatus to:
set an exposure condition for each region of the plurality of regions of the image;
obtain a maximum exposure condition and a minimum exposure condition among the exposure conditions set for each region of the plurality of regions of the image; and
correct the set exposure condition of at least one region among the plurality of regions of the image so as to decrease a difference between the maximum exposure condition and the minimum exposure condition which are included in the exposure conditions set for each region of the plurality of regions of the image,
wherein the one or more memories further store instructions that, when executed by the one or more processors, cause the apparatus to determine whether the difference between the maximum exposure condition and the minimum exposure condition exceeds a threshold value, and
wherein the set exposure condition of the at least one region among the plurality of regions of the image is corrected so as to decrease the difference between the maximum exposure condition and the minimum exposure condition according to whether the difference between the maximum exposure condition and the minimum exposure condition exceeds the threshold value.

2. The apparatus according to claim 1, wherein the one or more memories further store instructions that, when executed by the one or more processors, cause the apparatus to perform preliminary exposure for determining the exposure conditions set for each region of the plurality of regions of the image.

3. The apparatus according to claim 1, wherein
a value of the exposure condition for a relatively bright region is set to be lower than a value of the exposure condition for a relatively dark region.

4. The apparatus according to claim 1, wherein
the set exposure condition of the at least one region is corrected based on the difference between the maximum exposure condition and the minimum exposure condition which are included in the set exposure condition.

5. The apparatus according to claim 4, wherein
the set exposure condition of the at least one region is corrected so that the difference between the maximum exposure condition and the minimum exposure condition which are included in the set exposure condition is equal to or less than an allowable maximum exposure difference.

6. The apparatus according to claim 5, wherein
the set exposure condition of the at least one region is corrected in accordance with the following expression:

$$E' = \frac{E_{th}}{E_{max} - E_{min}} E$$

where E' represents an exposure condition after correction, E represents an exposure condition before correction, Emax represents the maximum exposure condition, Emin represents the minimum exposure condition, and Eth represents the allowable maximum exposure difference.

7. The apparatus according to claim 6, wherein
the allowable maximum exposure difference denoted as Eth is one value within a range between 1/3 and 1.

8. The apparatus according to claim 1, wherein the imaging condition includes at least one of a lens aperture value, ISO sensitivity, and a shutter speed.

9. The apparatus according to claim 1, wherein the apparatus is configured to operate in an image capturing mode of either a first mode representing a broad dynamic range or a second mode placing a priority on a tone representation.

10. The apparatus according to claim 9, wherein in a case where the apparatus operates in the second mode, the set exposure condition of the at least one region is corrected, and in a case where the apparatus operates in the first mode, the set exposure condition for each region of the plurality of regions is not corrected.

11. The apparatus according to claim 1, further comprising
an imaging unit configured to capture an image in accordance with the imaging condition and the exposure condition set for each region of the plurality of regions.

12. The apparatus according to claim 11, wherein in a case where the exposure condition of a region is corrected, the imaging unit captures the image in accordance with an imaging condition to be changed based on the corrected exposure condition of the region.

13. The apparatus according to claim 12, wherein a change of the imaging condition based on the corrected exposure condition is made by changing at least either one of ISO sensitivity and a shutter speed.

14. The apparatus according to claim 12, wherein a change of the imaging condition based on the corrected exposure condition is made by using a table in which values for an exposure condition, ISO sensitivity, and a shutter speed are stored.

15. The apparatus according to claim 12, wherein
a change of the imaging condition based on the corrected exposure condition is made in conformance with an image capturing mode, and
the image capturing mode includes a mode of placing a priority on a shutter speed and a mode of fixing ISO sensitivity.

16. The apparatus according to claim 11, wherein the one or more memories further store instructions that, when executed by the one or more processors, cause the apparatus to perform development processing for image data acquired by capturing an image, and
wherein the development processing includes white balance processing, demosaic processing, and gamma processing.

17. The apparatus according to claim 1, wherein the one or more memories further store instructions that, when executed by the one or more processors, cause the apparatus to set a reference region among the plurality of regions where an exposure condition is retained,
wherein an exposure condition of the reference region is not corrected, and an exposure condition of a region other than the reference region is corrected.

18. The apparatus according to claim 1, wherein the exposure condition includes at least any one of an aperture, a shutter speed, and ISO sensitivity.

19. A method for generating a high-dynamic-range image which is performed by an apparatus that is capable of setting an imaging condition for each region of a plurality of regions of an image, the method comprising:
setting an exposure condition for each region of the plurality of regions of the image;
obtaining a maximum exposure condition and a minimum exposure condition among the exposure conditions set for each region of the plurality of regions of the image; and
correcting the set exposure condition of at least one region among the plurality of regions of the image so as to decrease a difference between the maximum exposure condition and the minimum exposure condition which are included in the exposure conditions set for each region of the plurality of regions of the image,
wherein the apparatus is caused to determine whether the difference between the maximum exposure condition and the minimum exposure condition exceeds a threshold value, and
wherein the set exposure condition of the at least one region among the plurality of regions of the image is corrected so as to decrease the difference between the maximum exposure condition and the minimum exposure condition according to whether the difference between the maximum exposure condition and the minimum exposure condition exceeds the threshold value.

20. A non-transitory computer readable storage medium storing a program for causing a computer to execute a method for generating a high-dynamic-range image by setting an imaging condition for each region of a plurality of regions of an image, the method comprising:
setting an exposure condition for each region of the plurality of regions of the image;
obtaining a maximum exposure condition and a minimum exposure condition among the exposure conditions set for each region of the plurality of regions of the image; and
correcting the set exposure condition of at least one region among the plurality of regions of the image so as to decrease a difference between the maximum exposure condition and the minimum exposure condition which are included in the exposure conditions set for each region of the plurality of regions of the image,
wherein the apparatus is caused to determine whether the difference between the maximum exposure condition and the minimum exposure condition exceeds a threshold value, and
wherein the set exposure condition of the at least one region among the plurality of regions of the image is corrected so as to decrease the difference between the maximum exposure condition and the minimum exposure condition according to whether the difference between the maximum exposure condition and the minimum exposure condition exceeds the threshold value.

21. The apparatus according to claim 1,
wherein the set exposure condition of a first region among the plurality of regions of the image having the maximum exposure condition is corrected in a case where the difference between the maximum exposure condition and the minimum exposure condition exceeds the threshold value, and the set exposure condition of the first region among the plurality of regions of the image having the maximum exposure condition is not corrected in a case where the difference between the maximum exposure condition and the minimum exposure condition does not exceed the threshold value.

* * * * *